US005978018A

United States Patent [19]

Sakui

[11] Patent Number: 5,978,018

[45] Date of Patent: Nov. 2, 1999

[54] SURVEILLANCE SYSTEM HAVING AN OPERABLE RECORDING DEVICE AND A DUMMY RECORDING DEVICE

[75] Inventor: Masato Sakui, Nagaokakyo, Japan

[73] Assignee: Mitsubishi Denki Kabushiki Kaisha, Tokyo, Japan

[21] Appl. No.: 09/221,153

[22] Filed: Dec. 28, 1998

Related U.S. Application Data

[62] Division of application No. 08/785,800, Jan. 21, 1997, Pat. No. 5,898,458, which is a continuation of application No. 08/332,781, Nov. 1, 1994, abandoned.

[30] Foreign Application Priority Data

Nov. 2, 1993 [JP] Japan .................................. 5-274394

[51] Int. Cl.[6] ...................................... H04N 07/18

[52] U.S. Cl. ...................................... 348/151; 348/143

[58] Field of Search .............................. 348/143, 151, 348/153, 154, 156, 159; 360/137

[56] References Cited

U.S. PATENT DOCUMENTS 3,285,151 11/1966 Black .
4,237,483 12/1980 Clever .
4,651,144 3/1987 Pagano .
4,922,339 5/1990 Stout et al. .
4,991,008 2/1991 Nama .
5,053,906 10/1991 Rayis ................................ 360/137
5,128,755 7/1992 Fancher .
5,202,759 4/1993 Laycock .
5,359,363 10/1994 Kuban et al. .
5,402,167 3/1995 Einbinder .

FOREIGN PATENT DOCUMENTS

4229257 A1 3/1994 Germany .
2193385 7/1990 Japan .
3180923 8/1991 Japan .
3183061 8/1991 Japan .
9419571 A1 1/1994 WIPO .

*Primary Examiner*—Anand S. Rao

[57] ABSTRACT

A surveillance information recording system comprises a recording device loaded with a recording medium for recording video information concerning the object or place to be monitored, and a dummy device which can eject a recording medium in a manner similar to that in which a recording medium is ejected from an ordinary recording device. The recording device is located in an inconspicuous place, or concealed. The dummy device is located in a relatively conspicuous place. An intruder will mistakenly believe that if he carries out an ejecting operation on the dummy device and takes away the ejected recording medium, no evidence against him will be left behind. As an alternative, two loading sections may be provided in a single recording device, the recording of information being carried out in one of the loading sections, and the recording medium in the other loading section being ejected responsive to an ejecting operation.

5 Claims, 15 Drawing Sheets

SURVEILLANCE SYSTEM HAVING AN OPERABLE RECORDING DEVICE AND A DUMMY RECORDING DEVICE

This application is a divisional of application Ser. No. 08/785,800, now U.S. Pat. No. 5,898,458, filed on Jan. 21, 1997, filed Nov. 11, 1994, which was a continuation of application Ser. No. 08/332,781, now abandoned, the entire contents of which are hereby incorporated by reference.

BACKGROUND OF THE INVENTION

The present invention relates to an information recording system for the purpose of surveillance in the field of security, and particularly to a countermeasure against burglary of recording media on which information has been recorded.

A surveillance information recording device, e.g., a VTR (video tape recorder) provided for security, records information from one or more TV cameras that pick up images of places requiring surveillance. The recorded information, e.g., image information, is utilized for identifying the intruder in the event of a burglary or the like.

However, in such a surveillance information recording device, the intruder may remove the recording medium, e.g. a magnetic tape, on which information about him has been recorded before making his escape. If the recording medium is removed, the necessary information is not left, and the intended function of the recording device is not accomplished.

SUMMARY OF THE INVENTION

The present invention has been made to solve the above described problem and its object is to prevent removal or taking-away of the recording media.

Another object of the invention is to increase the probability that a dummy device provided to prevent removal or taking-away of the recording medium is mistaken for a real recording device.

Another object of the invention is to effectively utilize the space within the dummy device.

Another object of the invention is to enable the control of the real recording device through operation of the manual input section of the dummy device.

Another object of the invention is to enable display the status of the real recording device on the display section of the dummy device.

A further object of the invention is to make the false recording medium to more convincingly appear to be a real recording medium in a recording device provided with loading sections which accommodate the false recording medium as well as the real recording medium in order to prevent removal or taking-away of the real recording medium.

A further object of the invention is to make it difficult to eject a real recording medium from a recording device provided with loading sections which accommodate the false recording medium as well as the real medium in order to prevent removal or taking-away of the real recording medium.

A surveillance information recording system according to one aspect of the present invention is provided with a recording device capable of recording on a recording medium and a dummy device which has an appearance similar to that of an ordinary recording device and which is provided with a loading section which can load a recording medium, and ejection of a recording medium from said loading section can be effected in a manner similar to that in which ejection is effected in an ordinary recording device.

If a dummy device is set up as described above, the intruder will remove the recording medium from the dummy device in the erroneous belief that he is not leaving behind any recording which might serve as evidence against him. Accordingly, the recording medium in the real recording device, on which the necessary information is recorded, will be spared from removal.

Instead of adopting the concept of the invention, concealing the recording device itself may be considered, but such concealment is not effective because the intruder will search till he finds the recording device. According to the invention, the intruder will mistake the dummy device for the real device, will feel secure in the false belief that by removing the false recording medium he is not leaving behind any recording which might serve as evidence against him, and will search no further, so the real recording medium will be spared from removal.

In a preferred form, the recording device is disposed inconspicuously or being concealed, while the dummy device is disposed such that it is more conspicuous. The probability that the dummy device is mistaken for a recording device is thereby increased.

The dummy device may be provided with a manually-operated part for ejecting a recording device. This will further increase the probability that the dummy device is mistaken for a recording device.

The recording medium eject means in the dummy device may be so arranged as to include a mechanism which operates using the operations of the manually-operated part as driving source. Then, the dummy device requires no electric power supply, the configuration of the entire system and its wiring are simple.

The recording medium eject means in the dummy device may alternatively be made to have a motor driven in response to operation of a manually-operated part and a mechanism driven by the motor. The force required to operate the manually-operated part is reduced, and the probability that the dummy device is mistaken for a recording device is further increased.

The dummy device may be further provided with a power supply circuit receiving commercial power supply for generating electric power required for energizing the motor. It will then be unnecessary to provide a separate individual power supply for the energization of the motor.

Alternatively, the dummy device may be provided with an battery for generating electric power required for energizing the motor. It is then unnecessary to provide a separate power supply for the energization of the motor.

The dummy device may be provided with a power supply circuit for energizing external devices. Then, the space within the dummy device can be effectively utilized, and there will be no need for providing a separate power supply device even when the recording device requires an external power supply. Moreover, if the dummy device is provided with a switch for video signals, the space within the dummy device can be effectively utilized, and it is possible to achieve switching for multiplexing signals from the plurality of TV cameras and sending the multiplexed signals to a single recording device.

The dummy device may be provided with a semiconductor memory for storing video signals. Then, the space within the dummy device can be effectively utilized, timing for recording can be adjusted, and data obtained by image pick-up during exchange of recording media can be recorded on the recording medium by once storing the data in the semiconductor memory.

The dummy device may be further provided with a display section and a microcomputer which controls the mechanism and display on the display section based on the operations of the manual input section and has a timer function, the displayed contents changes in response to the operation of the manual input section. The probability that the dummy device is mistaken for a real recording device is then further increased.

The arrangement may be such that the dummy device sends signals in accordance with operations of the manual input section and the recording device is controlled in response to the signals sent from the dummy device. Then, the recording device can be conveniently controlled by operating the manual input section of the dummy device even when the former is disposed at a location difficult to access.

The arrangement may be such that the recording device sends signals indicative of its state and the display section of the dummy device displays according to the signals sent from the recording device. Then, the state of the recording device can be seen on the display section of the dummy device, providing convenience to the user. It is especially convenient when control of the recording device is achieved by means of the manual input section of the dummy device.

A surveillance information recording device according to another aspect of the invention comprises, first and second loading sections, each capable of loading a recording medium, means for recording on a recording medium loaded in the first loading section, means for ejecting a recording medium from the first loading section, and means for ejecting a recording medium from the second loading section wherein the ejection from the second loading section is performed by an operation similar to that of an ordinary recording device, and the ejection from the first loading section is performed in a different way from the ejection from the second loading section, or an outlet for the ejection from the first loading section is hidden.

With the above configuration, the intruder will remove the recording medium ejected from the second loading section in the erroneous belief that he is not leaving behind any recording which might serve as evidence against him. Accordingly, the recording medium in the first loading section, on which necessary information is recorded, will be spared from removal.

In a preferred form, it is so arranged that ejection from the first loading section is effected by operations including switch operation in a some special mode or password entry. With such an arrangement, it is hard to find the presence of a real recording medium, and removal of the recording medium becomes more difficult.

A single opening may be used for ejection both from the first and second loading sections, and it is not possible to eject the recording medium from the first loading section in a state in which a recording medium is present in the second loading section. The configuration is then simplified, and it is more difficult to know the presence of the first loading section.

A surveillance information recording device according to a further aspect of the present invention comprises, first and second loading sections, each capable of loading a recording medium, means for recording on the recording medium loaded in the first loading section, means for ejecting the recording medium from the second loading section, and means for ejecting the recording medium from the second loading section, wherein the ejection from the second loading section is effected in a manner similar to that in which ejection is effected in an ordinary recording device, and an outlet for the ejection from the first loading section is concealed.

With the above arrangement, the intruder will be led to an erroneous belief that removing and taking away the recording medium which is ejected from the second loading section will leave behind no recording whites might serve as evidence. The recording medium in the first loading section is thereby prevented from being removed and taken away.

In a preferred form, it is so arranged that ejection from the first loading section is done by operations including switch operation in a some special mode or password entry. It is then difficult to find the presence of the real recording medium and remove the recording medium.

DETAILED DESCRIPTION OF THE PREFERRED EMBODIMENTS

Embodiments of the present invention will now be described with reference to the drawings.

Embodiment 1

Figure 1:
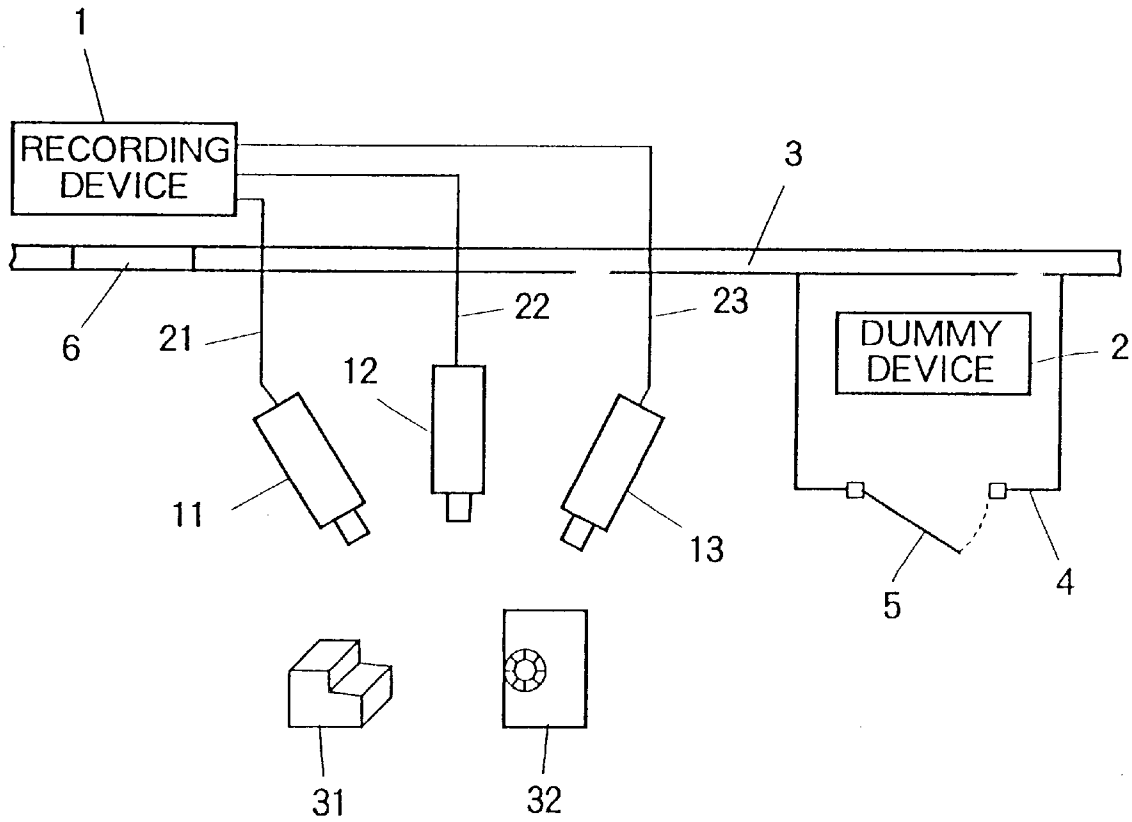
FIG. 1 is a schematic diagram showing an arrangement of a real recording device and a dummy device in Embodiment 1 of the present invention.
Figure 2:
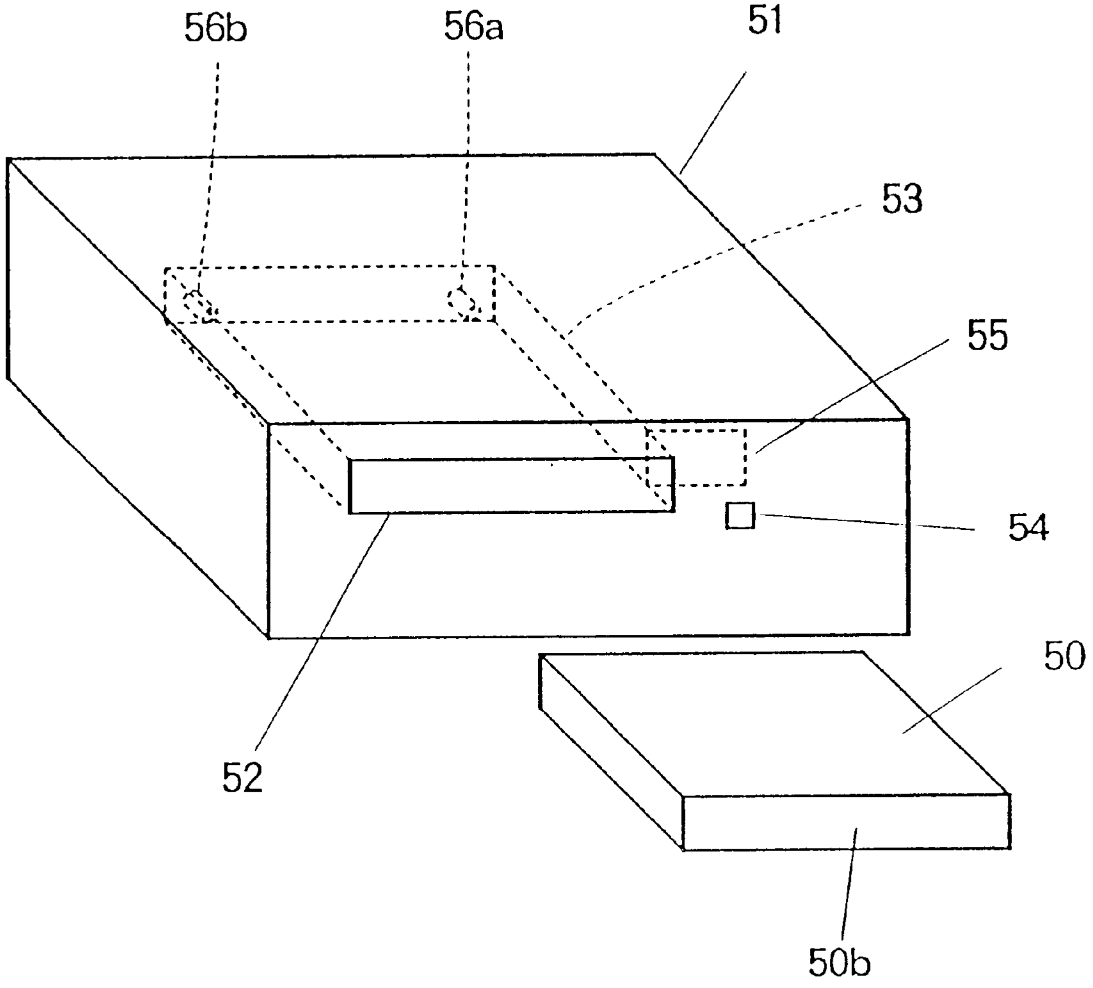
FIG. 2 is a schematic diagram showing the dummy device in Embodiment 1.

Embodiment 1 will first be described referring to FIG. 1, 2 and 3. As shown in FIG. 1, this embodiment relates to a surveillance information recording system provided with a real recording device 1 and a false recording device or a dummy device 2. The dummy device 2 is provided to prevent removal of the recording medium in the real recording device 1. The real recording device 1 is hidden (disposed behind the wall 3), while the dummy device 2 is disposed in such a place that it is relatively easily found. Specifically, in the illustrated example, a dummy device is disposed in a special room 4. but at a position which will be found easily if a door 5 is opened and is relatively easily found, as compared with the real recording device 2 which is disposed behind the wall and at a position which is not accessible until a special opening/closing member 6 (which is not readily recognized as such) is opened.

The real recording device 1 is connected to television cameras 11, 12 and 13 via cables 21, 22 and 23. The television cameras 11, 12 and 13 are for picking up images of the scenes of the places where what can be an object of burglary, e.g. a cash register 31, a safe 32, or the like, is placed, and their video signals are sent to the real recording device 1 via the cable 21, 22 and 23. The real recording device 1 sequentially selects these video signals, time-division-multiplexing them, and records them.

The dummy device 2, which has an appearance similar to that of an ordinary recording device, is provided with a housing 51, a recording medium insert/eject opening 52, a recording medium loading section 53, a recording medium eject button 54 and an mechanism 55. A recording medium 50 is inserted through the insert/eject opening 52, and guided through an insertion path 57 to the loading section 53, and is loaded therein. At the bottom of the loading section 53, springs 56*a* and 56*b* are provided, which can be resiliently transformed (e.g., compressed) when the recording medium 50 is loaded in the loading section 53. A knob 60 is provided at such a position that when the recording medium 50 is inserted into the loading section 53, it abuts with the knob 60. A spring 62 is held by a fixed holder 63 and provides the knob 60 with a pushing force in the direction in which the knob 60 is projected into the insertion path 57. A shaft 61 integral with the knob 60 is coupled to a rotatory plate 67 via pin 64. The rotatory plate 67 is journaled by a shaft 66, and is rotatable about the shaft 66. An eject button 54 is coupled to the rotatory plate 67 through a pin 65.

When a user inserts a recording medium, e.g., a cassette tape, 50 from the insert/eject opening 52, the knob 60 which is biased by the spring 62 is pushed back by the recording medium 50 and retracted sideward. As the knob 60 moves sideward, the shaft 61 integral with the knob 60 also moves sideward, and rotates the rotatory plate 67 coupled to an end of the shaft 61 via the pin 64 clockwise as seen in FIG. 3.

When the recording medium 50 is inserted into the loading section 53, its front end (the end away from the user) 50*a* pushes and resiliently transforms the springs 56*a* and 56*b*.

Figure 3:
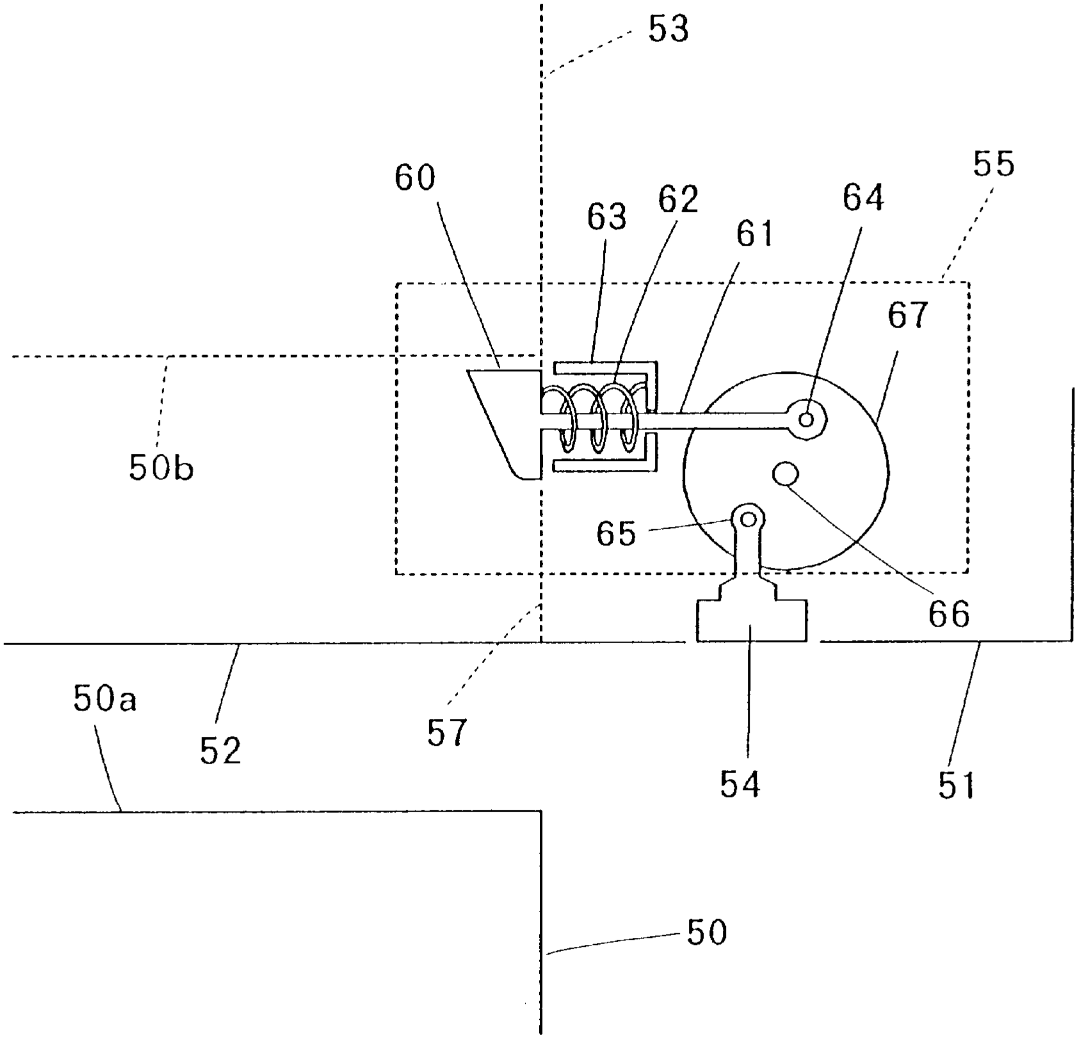
FIG. 3 is a diagram showing an insert/eject mechanism for the dummy device of Embodiment 1.

When a rear end (the end near the user) 50*b* of the recording medium 50 moves beyond the knob 60, the knob 60 projects, being biased by the spring 62, and is engaged with the rear end 50*b* of the recording medium 50, as illustrated by dotted lines in FIG. 3. As a result, even if the user releases the recording medium, the recording medium 50 is not ejected and is held at a predetermined loading position.

When the user presses the eject button 54, the rotatory plate 67 rotates clockwise, which causes the shaft 61 and the knob 60 to draw back sideward, that is, the engagement between the rear end 50*b* of the recording medium 50 and the knob 60 is released. Then, the recording medium 50 is ejected by the action of the springs 56*a* and 56*b*.

As described above, in the dummy device 2, an ejection of the recording medium 50 is achieved by mechanically transmitting the operation of the eject button 54.

Although the dummy device does not have recording circuits or mechanisms, it is so made that it looks like an ordinary recording device. Therefore, an intruder will mistake it for the real recording device, and erroneously believe that if he causes the dummy device to eject a recording medium and takes the recording medium away, no recording that might be used against him will be left behind. It is thus possible to prevent the real recording medium from being taken away, and the recording medium can be later used for identifying the intruder.

Instead of disposing the recording device in a less conspicuous manner, it may be disposed in a remote location (such as in a separate building or some geographically separated place).

Embodiment 2

Figure 4:
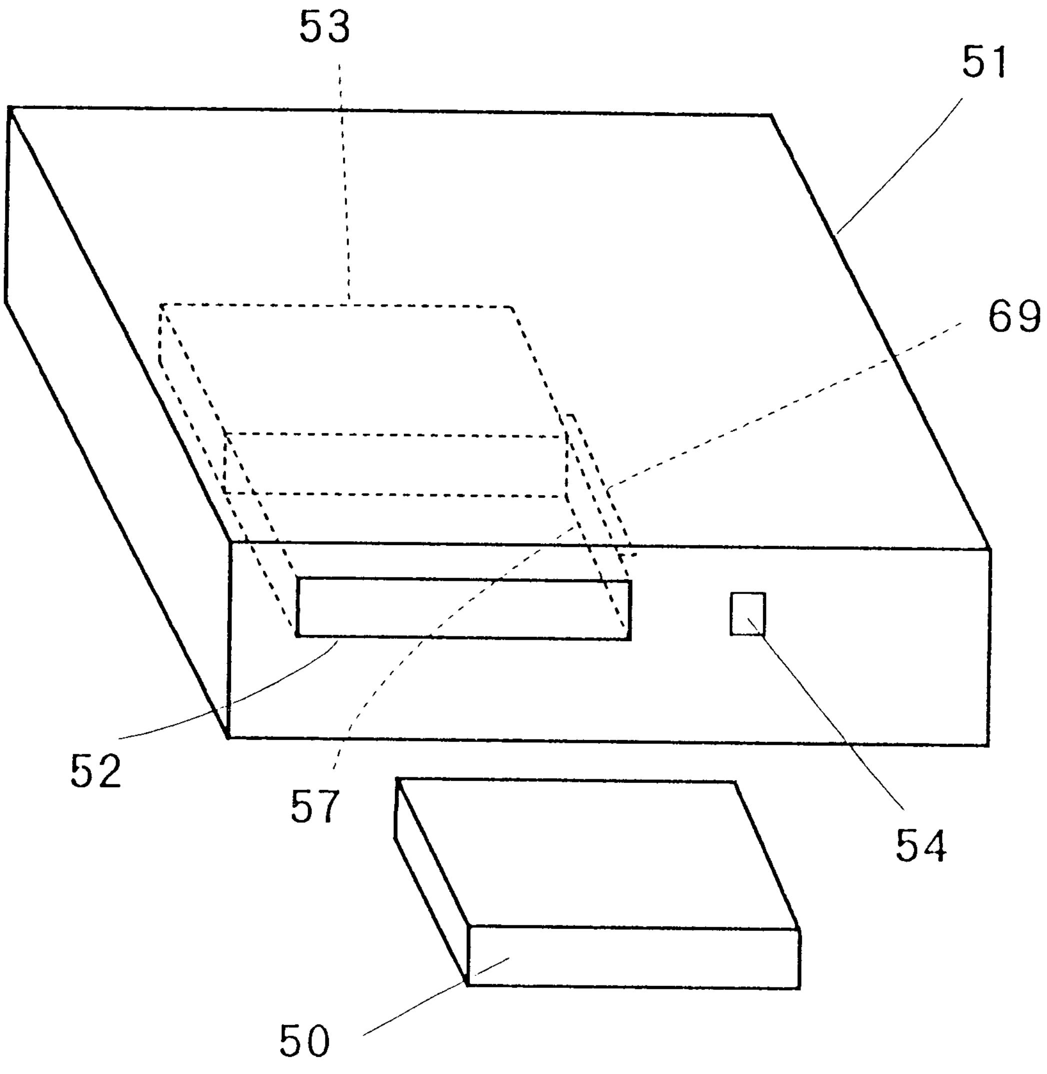
FIG. 4 is a schematic diagram showing the dummy device in Embodiment 2.

Embodiment 2 will next be described with reference to FIGS. 4 to 6. This embodiment also relates to a surveillance information recording system including a real recording device and a dummy device, but differs from Embodiment 1 in the configuration of the dummy device 2.

The dummy device 2 according to this embodiment has a recording medium insert/eject opening 52, a recording medium loading section 53, a recording medium eject button 54 and an insert/eject mechanism 69. The recording medium 50 is inserted through the insert/eject opening 52, and guided through an insertion path 57 to the loading section 53 and is loaded therein. Slide bars 74*a* and 74*b* are provided to extend along the insertion path 57 and along the sides of the loading section 53, and guide the recording medium for conveyance during insertion and ejection of the recording medium.

When the user inserts a recording medium 50 through the insert/eject opening 52, the insertion is detected by a microswitch 58, and by the action of a controller 59 a pair of switches 77 are turned to a first connection state (the state indicated by solid lines in the figure) causing a motor 72 to rotate in one or forward direction. The rotation of the motor 72 is transmitted via gears 71*a* and 71*b* to a gear 70, and is transformed to linear movement by a pinion 75 whose shaft is fixed to the gear 70, and a rack 76. The rack 76 is provided with an engagement section (not shown) which is engaged with a recording medium. As the rack moves, the recording medium is transported, being guided by the slide bars 74*a* and 74*b*. The recording medium 50 is thus conveyed to the loading section 53.

When the user pushes the eject button 54, the action of the controller 59 turns the switches 77 to a second connection state (the state indicated by broken lines in the figure), and the motor 72 is rotated in the direction (reverse direction) opposite to the first mentioned direction. The rotation is transmitted via the gears 71*a* and 71*b* to the gear 70 and is transformed, by means of the pinion 75 having its shaft connected to the gear 70, and the rack 76, to linear movement in the direction opposite to the direction during the insertion. As the rack 76 moves, the medium 50 is conveyed accordingly, again being guided by the slide bars 74*a* and 74*b*. The medium 50 is thus ejected from the loading section 53.

As in Embodiment 1, the dummy device according to the embodiment does not have recording circuits or mechanisms, but its appearance is rendered similar to that of an ordinary recording device. Therefore, the intruder will mistake it for a real recording device, and erroneously believe that if he causes the dummy device to eject a recording medium and takes the recording medium away, no recording that might be used against him will be left behind. The recording device and the recording medium in the recording device are thus prevented from being taken away, and it will be possible to utilize the information recorded on the recording medium for identifying the intruder.

In the illustrated example, the electric power for the motor 72 is supplied from a constant voltage power supply circuit 78 via a switch 77. As an alternative, a drive circuit (not shown) may be interposed between the constant voltage power supply circuit 78 and the motor 72, and may be turned on or off by means of switches.

Embodiment 3

Embodiment 3 will next be described with reference to FIGS. 7, 8 and 9. As in Embodiments 1 and 2, a surveillance information recording system according to this embodiment includes a real recording device 1 and a dummy device 2. The dummy device 2 of this embodiment contains, within it, a power supply circuit receiving the alternating commercial power supply for providing a power of a predetermined voltage. This power supply circuit is used as the constant voltage power supply circuit 78 in FIG. 5 or a part of it.

Figure 7:
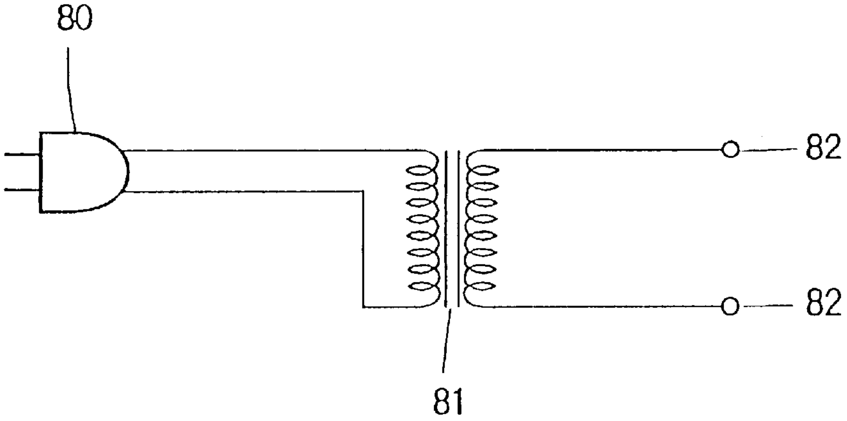
FIG. 7 is a diagram showing an example of the power supply circuit of Embodiment 3.

An example shown in FIG. 7 uses an a.c. power supply circuit having a plug 80 to be inserted into an electric outlet, a transformer 81 whose primary winding is connected to the plug 80 via conductors, and output terminals 82 connected to the secondary winding of the transformer 81.

Figure 8:
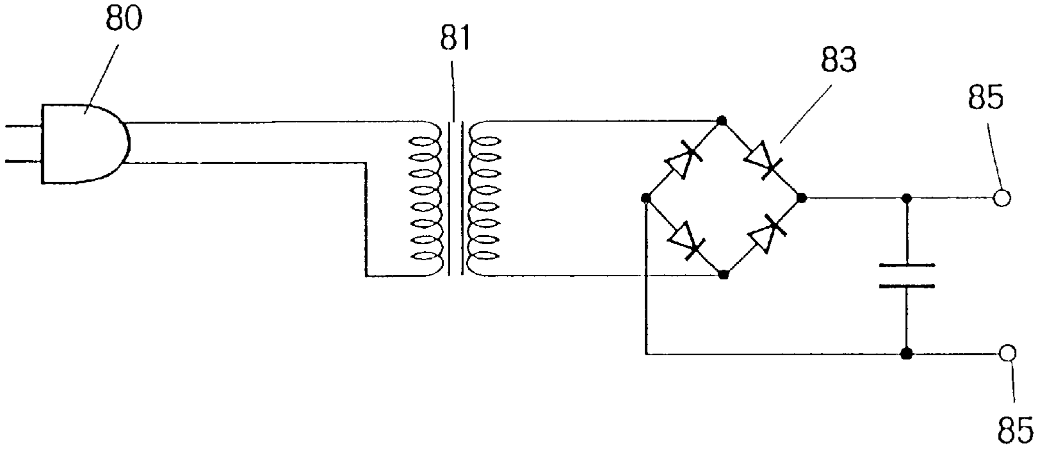
FIG. 8 is a diagram showing another example of the power supply circuit of Embodiment 3.
Figure 9:
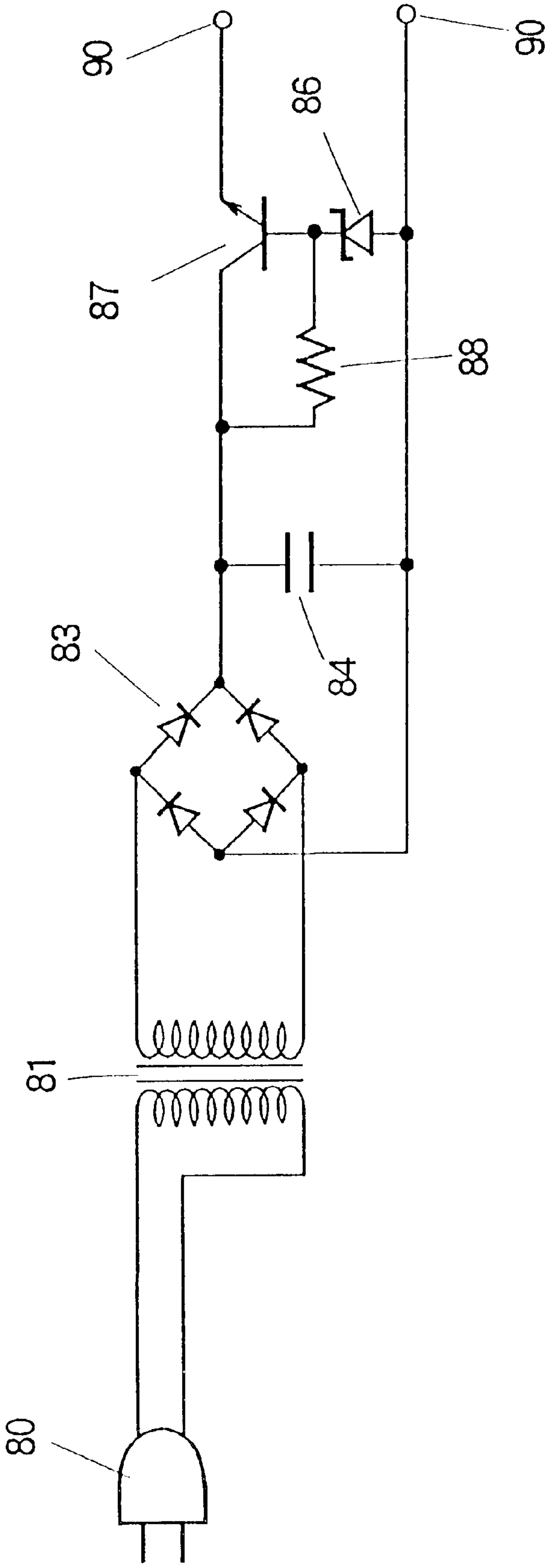
FIG. 9 is a diagram showing still another example of the power supply circuit of Embodiment 3.

An example shown in FIG. 8 is for a d.c. power supply circuit having a plug 80, and transformer 81 as in the example of FIG. 7, as well as a diode-bridge type rectifier 83 whose a.c. terminals are connected to the secondary winding of the transformer 81, a smoothing capacitor 84 and output terminals 85 connected to d.c. terminals of the rectifier 83.

Figure 5:
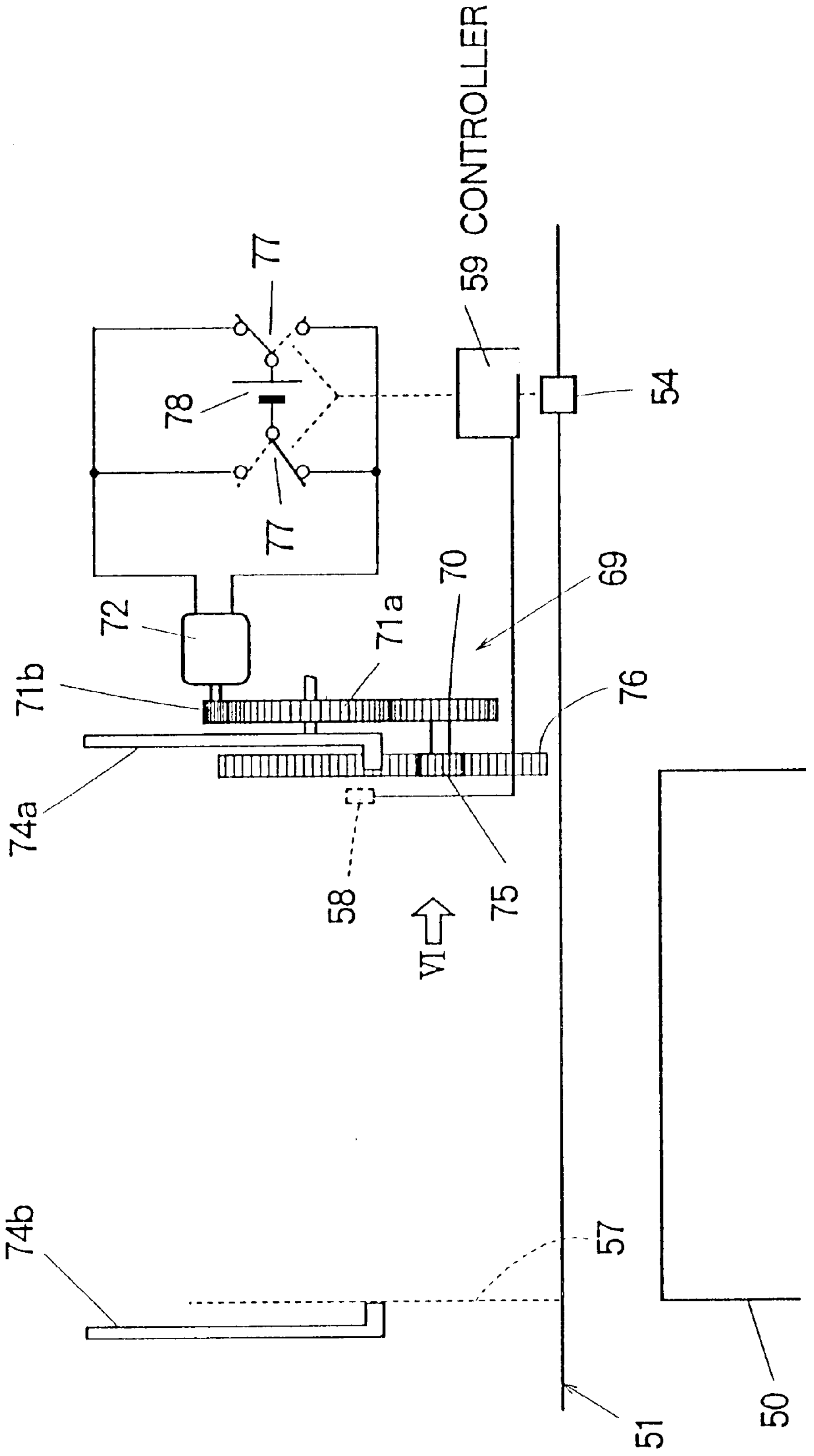
FIG. 5 is a diagram showing an insert/eject mechanism for the dummy device of Embodiment 2.
Figure 6:
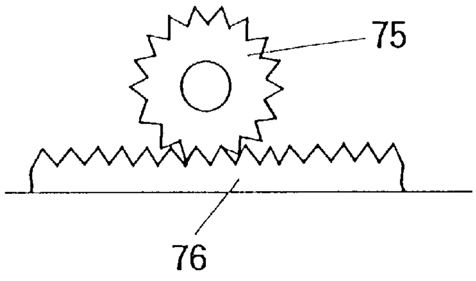
FIG. 6 is a diagram of the rack and the pinion as viewed in the direction of the arrow VI in FIG. 5.

In a further alternative, the terminals 85 are connected to a constant voltage circuit, and its output is used as the output of the constant voltage power supply circuit 78 shown in FIG. 5. An example of the constant voltage circuit is shown in FIG. 9. It comprises a constant voltage diode (Zener diode) 86, a transistor 87 and a resistor 88 interconnected as illustrated. With the illustrated circuit, an electric power with a constant voltage is obtained at the output terminals 90.

The constant voltage power supply need not include a constant voltage circuit described above, but may alternatively be comprised of a primary battery, a secondary battery, or the like.

The electric power produced by the power supply circuit explained with reference to FIG. 7, 8 or 9 may be used in the dummy device. It may alternatively or additionally be supplied to the outside of the dummy device. For instance, the output terminals of the power supply circuit may be used as terminals for connection with external equipment. For instance, the output of the power supply circuit may be supplied to the real recording device.

If a dummy device has power supplying function, the real recording device need not have a separate power supply device (e.g., a.c. adapter) even where the recording device requires an external d.c. power supply. Moreover, the space inside the dummy device can be utilized effectively. That is, the dummy device is configured such that its appearance is similar to that of an ordinary, real recording device, but it has fewer functions than a real recording device, so space is left over inside the dummy device. Using this left-over space for disposition of the power supply circuit makes effective use of the space as a whole.

More than one pair of terminals for connection with external equipment may be provided. Then it will be possible to supply electric power to more than one external equipment.

Embodiment 4

Embodiment 4 will next be described with reference to FIGS. 10 and 11. As in Embodiments 1, 2 and 3, an information recording device of this embodiment comprises a real recording device 1 and a dummy device 2. A difference is that video signals from television cameras 11, 12 and 13 are supplied to a real recording device 1 by way of a switch within the dummy device 2. Specifically, one ends of cables 21, 22 and 23 are connected to the television cameras 11, 12 and 23, and the other ends of the cables 21, 22 and 23 are connected to video input terminals 91, 92 and 93 of the dummy device. The dummy device 2 includes amplifiers 101, 102 and 103 connected to the input terminals 91, 92 and 93, and a switch 97 for selecting the output of the amplifiers, a further amplifier 98 for amplifying the output of the switch 97, and an output terminal 99 connected to the output of the amplifier 98. The output terminal 99 is connected to the real recording device 1 via a cable 26. Control over the switch 97 is performed by applying a control signal generated by an internal timing circuit 106, or a control signal supplied to the video signal selection control input terminal 107 from the outside. The selection between the two is effected by means of a switch 108.

In surveillance information recording systems, video signals from a plurality of television cameras are often sequentially selected and supplied to a single recording device. By disposing the switch required for the sequential selection within the dummy device, the space inside the dummy device is effectively utilized. That is, the dummy device is configured such that its appearance is similar to that of an ordinary, real recording device, but it has fewer functions than a real recording device, so space is left over inside the dummy device. Using this left-over space for disposition of the switch makes effective use of the space as a whole.

In the above example, the number of television cameras are assumed to be three, and accordingly the numbers of input terminals and amplifiers are also three. These numbers may however be other than three. Further, the output terminal of the dummy device may be connected to a monitor TV set, instead of or in addition to a real recording device.

If the output terminal of the dummy device may be connected to a monitor TV set, instead of a real recording device, the television cameras and the real recording device may be connected in some other ways, e.g., directly, as in Embodiments 1 and 2.

Embodiment 5

Embodiment 5 will next be described with reference to FIGS. 12 and 13. It is assumed that the number of television cameras is one in this embodiment. As in Embodiment 4, the output of a television camera 11 is connected to a dummy device 2 via a cable 21, and the output of the dummy device 2 is supplied to a real recording device 1. But unlike Embodiment 4, the dummy device 2 is provided with a semiconductor memory. Specifically, as shown in FIG. 13, the dummy device 2 of this embodiment includes a video input terminal 110, an amplifier 111 connected to the input terminal 110, an A/D converter 112 for digitizing the output of the amplifier 111, a semiconductor memory 113 for storing the output of the A/D converter 114, a D/A converter 114 for D/A converting the output read from the semiconductor memory 113, an amplifier 115 for amplifying the output of the D/A converter 114, and an output terminal 116 connected to the output of the amplifier 115. The input terminal 110 is connected to a cable 21. The output terminal 116 is connected to the real recording device 1 via the cable 26.

With such a function, the timing of video signal recording can be adjusted. Moreover, data obtained by image pick-up during exchange of recording media for a recording device can be recorded. Moreover, the space within a dummy device can be utilized effectively by disposing the semiconductor memory within the dummy device. That is, the dummy device is configured such that its appearance is similar to that of an ordinary, real recording device, but it has fewer functions than a real recording device, so space is left over inside the dummy device. Using this left-over space for disposition of the semiconductor memory device makes effective use of the space as a whole.

Further, the output terminal of the dummy device may be connected to a monitor TV set, instead of the real recording device, as in Embodiment 4.

In the above embodiment, the number of TV cameras is one and accordingly a single pair of input terminals are provided. If there are a plurality of TV cameras, there may be provided a switch, like that of Embodiment 4, to selectively supply the outputs of the cameras to the semiconductor memory device. As an alternative, the same number of semiconductor memory devices may be provided as are the number of TV cameras, and the output of the semiconductor memories may be supplied to a switch. The output of the switch may be supplied to the real recording device 1, or to a monitor TV set, or both.

Embodiment 6

Figure 14:
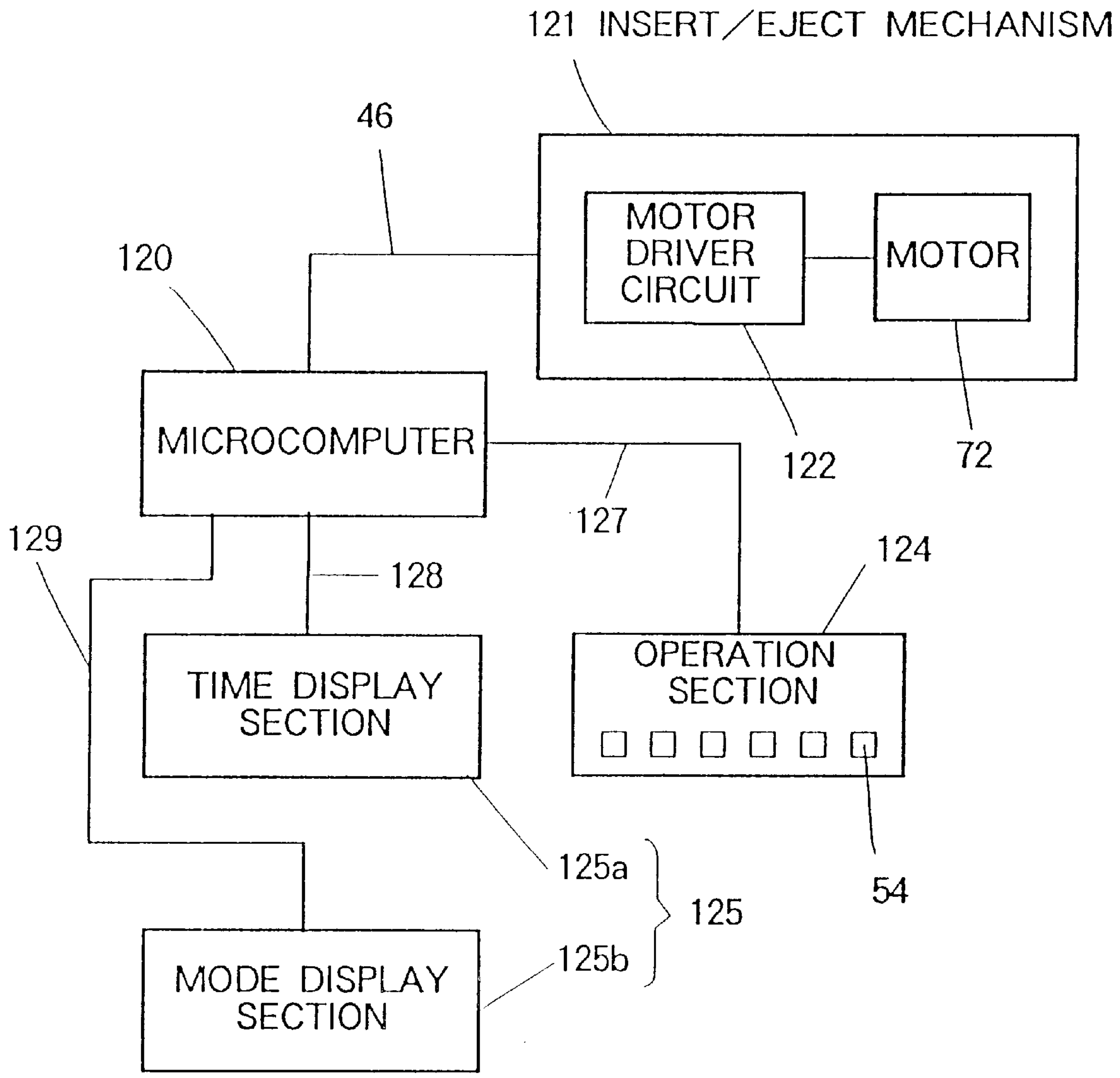
FIG. 14 is a block diagram showing a microcomputer, etc. provided within a dummy device of Embodiment 6.

Embodiment 6 will next be described with reference to FIGS. 14 and 15. This embodiment is also provided with a real recording device and a dummy device. The dummy device 2 is configured in the same manner as in Embodiments 2, 3 and 5, but it additionally includes a microcomputer 120. The microcomputer 120 is connected to the insert/eject mechanism 121 through one or more control lines 126 to control the insert/eject mechanism 121. The insert/eject mechanism 121 is provided with a motor 72 and a motor driver circuit 122. By the control over mechanism 121, the rack is moved in the same way as in Embodiment 2 to effect insertion and ejection of a recording medium.

The microcomputer 120 is also connected to the manual input section 124 through a control line 127. The manual input section 124 includes an eject switch 54 and other switches which have external appearances similar to those of the switches for playback and recording of an ordinary recording device. The microcomputer 120 is also connected to a display section 125 via control lines 128 and 129.

The display section 125 comprises a time display section 125*a* and a mode display section 125*b*. The mode display section 125*b* is intended for giving false display indicating that the device is recording, that it is playing back, and so on. Although the dummy device does not actually record or play back, giving such false display increases the apparent resemblance with the real recording device.

It may be so arranged that the microcomputer 120 further has a timer function, and the time display section 125*a* displays time. Furthermore, it may be so arranged that timer adjustment may be made by operations of the manual input section 124, and during adjustment of the timer, the display of the display section 125*a* may be made in a mode for timer adjustment. For instance, the digits indicating the hour may be intermittently turned on and off while the hour is adjusted, the digits indicating the minute may be intermittently turned on and off while the minute is adjusted, and so on.

Figure 15:
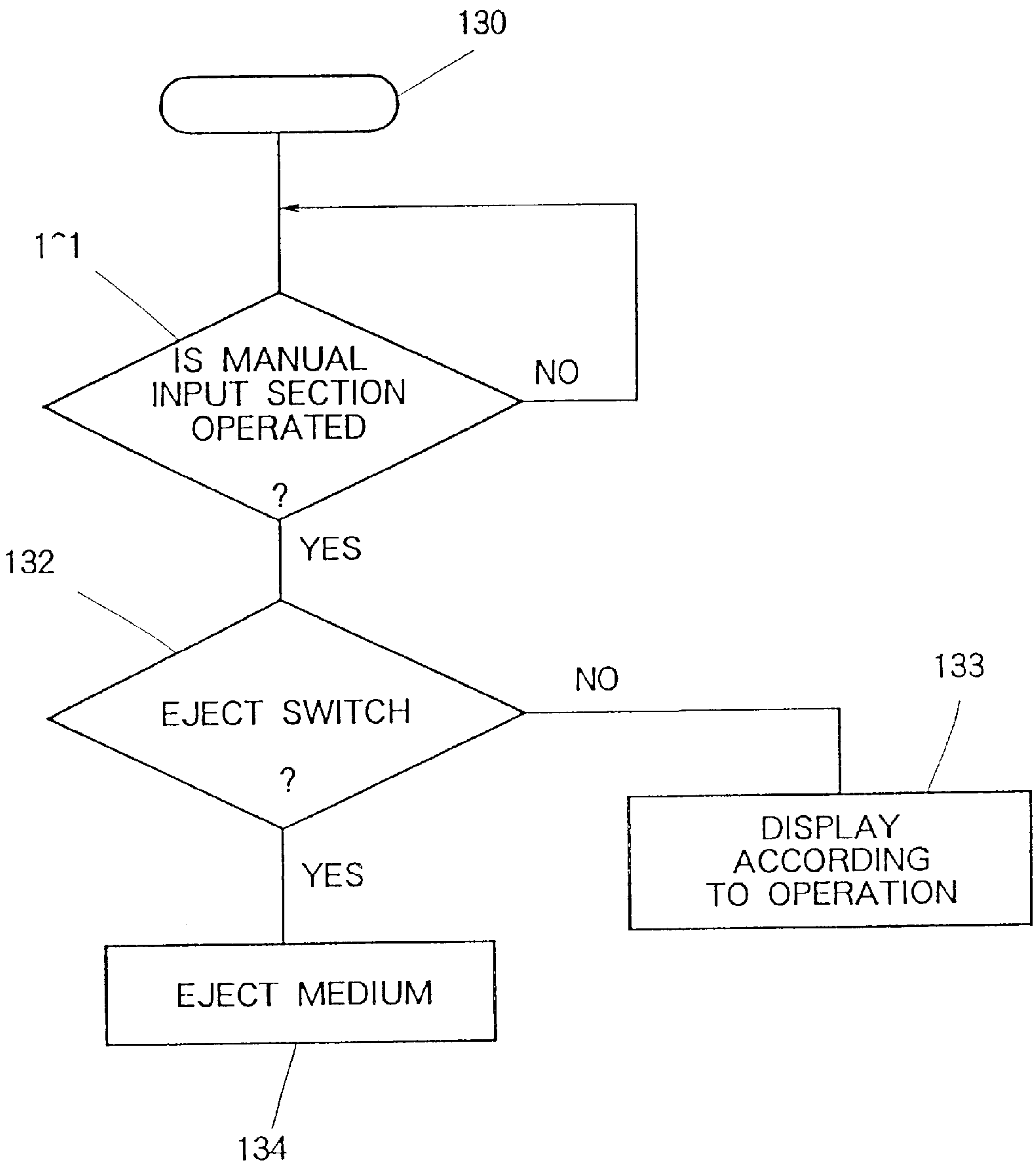
FIG. 15 is a flow chart illustrating the operation of a microcomputer of Embodiment 6.

FIG. 15 shows the operation of the microcomputer 120 performed in response to the operations of the manual input section 124. As shown in the figure, when the manual input section 124 is operated (131), the decision is made on whether a medium ejecting switch is operated or not (132). If so, the medium eject operation is carried out. Otherwise, display is made in accordance with the operation of the manual input section (133).

Embodiment 7

Figure 16:
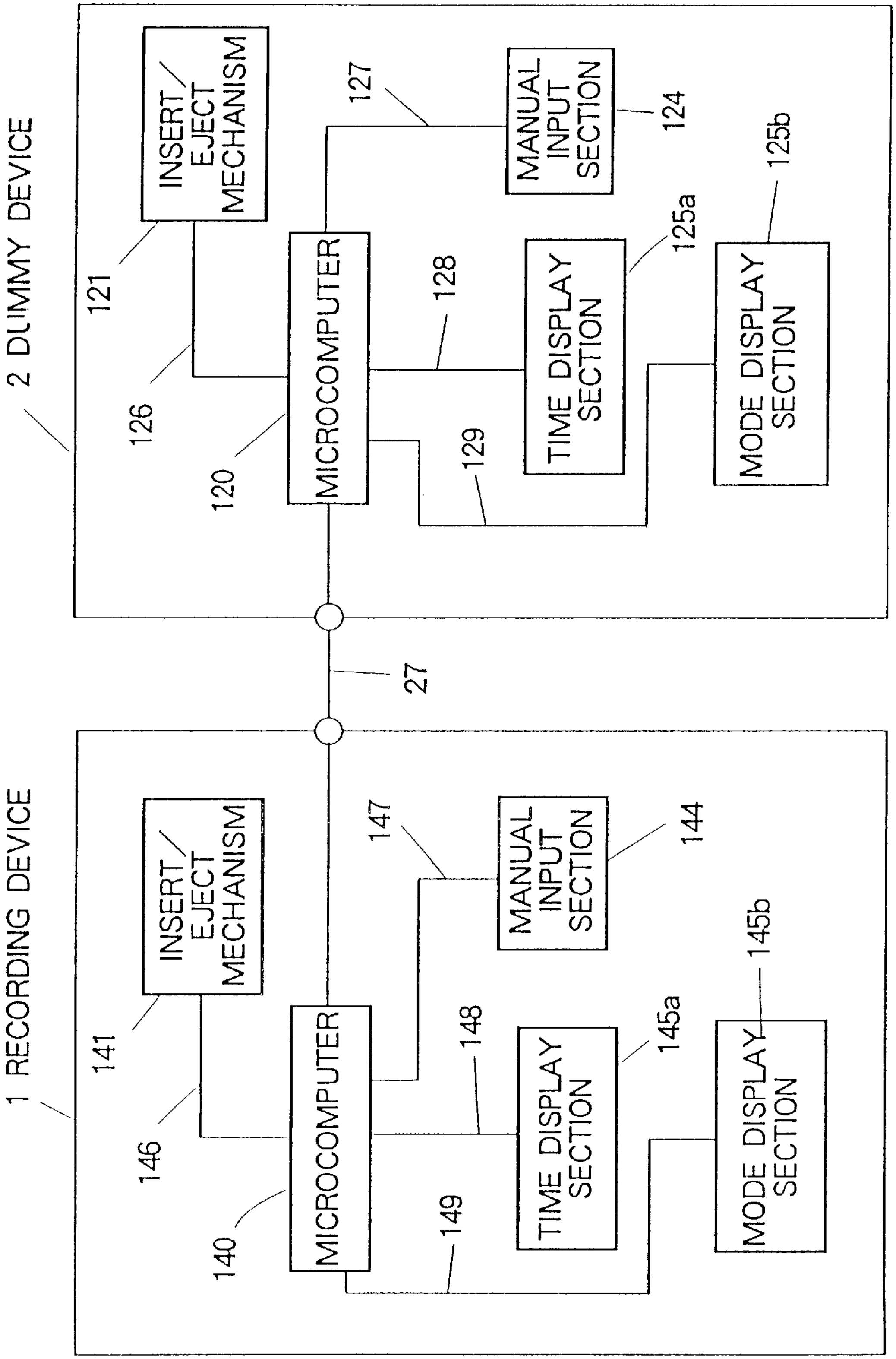
FIG. 16 is a block diagram showing a microcomputer, etc. provided within a dummy device and a microcomputer, etc. provided within a recording device in Embodiment 7.

Embodiment 7 will next be described with reference to FIGS. 16 and 17. Again, this embodiment is provided with a real recording device and a dummy device. FIG. 16 shows parts only of the dummy device and the real recording device which characterize the present embodiment. The dummy device of this embodiment is the same as that of Embodiment 6 in that both are provided with microcomputers 120. A difference is that the microcomputer 120 in the dummy device 2 is connected to a microcomputer 140 in the real recording device 1.

Connected to the microcomputer 140 in the real recording device 1 are the manual input section 144 via a control signal line 147, the time display section 145*a* via a control signal line 148, the mode display section 145*b* via a control signal line 149, and the insertion/eject mechanism 141 via a control signal line 146. These serve to perform the operation of the mechanism for insertion and ejection of the recording medium, the operation of the recording/playback section (recording, playback, stop), display of the operation mode, display of the time, adjustment of time, and the like.

The microcomputer 140 in the recording device 1 and the microcomputer 120 in the dummy device 2 are connected to each other by a control signal line 27.

When the manual input section of the dummy device 2 is operated, insertion, ejection and display in the dummy device 2 are controlled according to the operation of the manual input section in the same manner as in Embodiment 6, and at the same time the signal according to the operated part of the manual input section is transmitted from the microcomputer 120 to the microcomputer 140 via the control signal line 27. The microcomputer 140 operates in accordance with the transmitted control signal.

Figure 10:
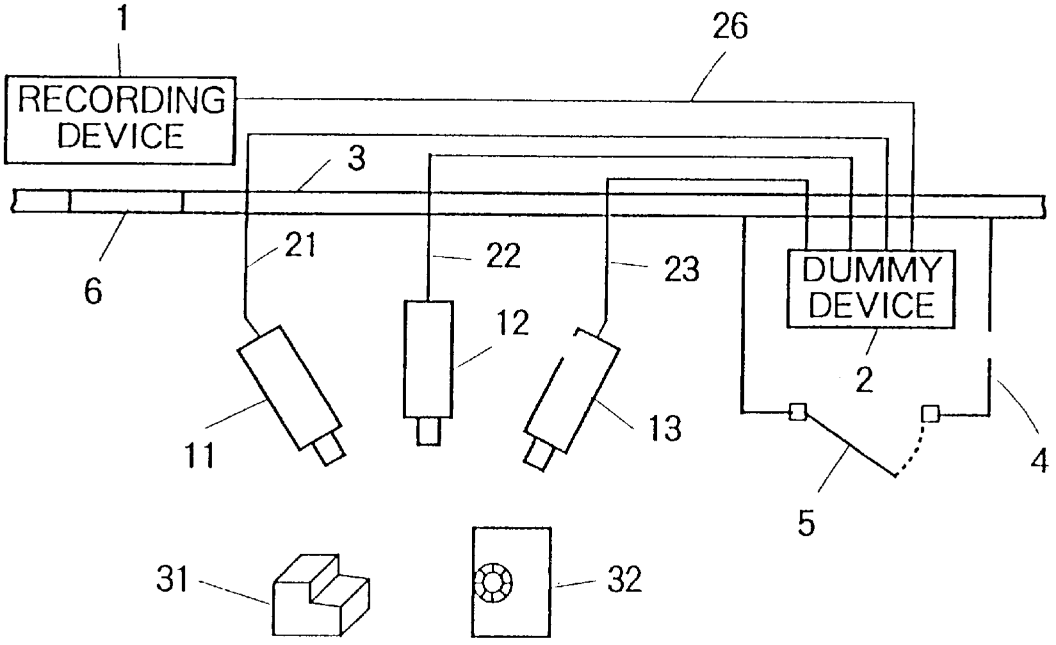
FIG. 10 is a diagram showing interconnection between a real recording device and a dummy device in Embodiment 4.
Figure 11:
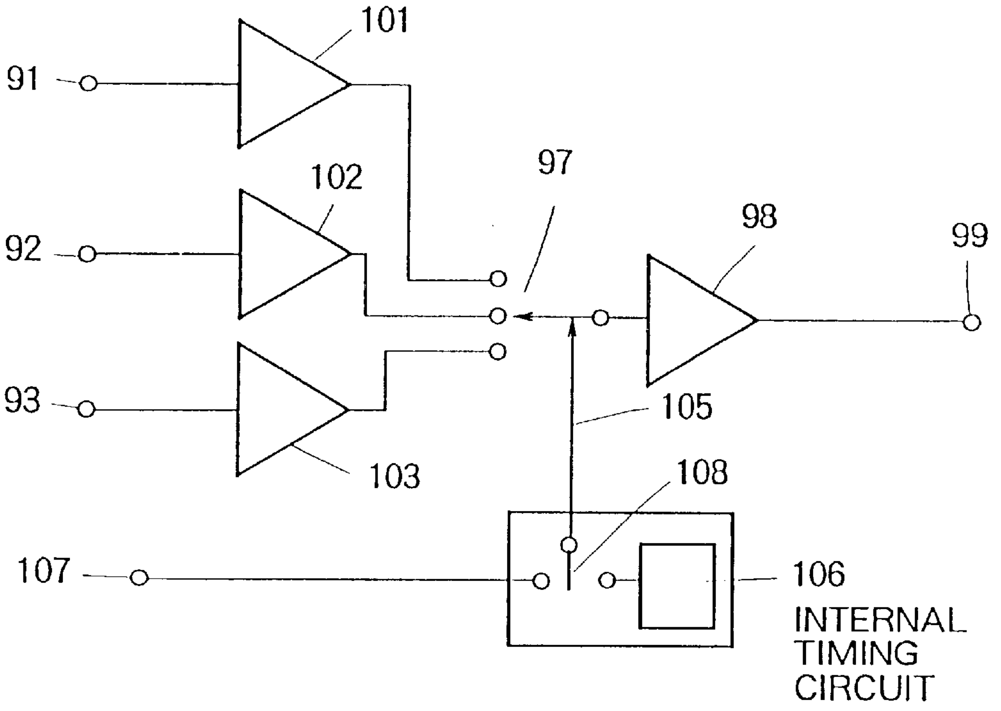
FIG. 11 is a diagram showing circuits which are provided within the dummy device of Embodiment 4 and which has a switching function.
Figure 12:
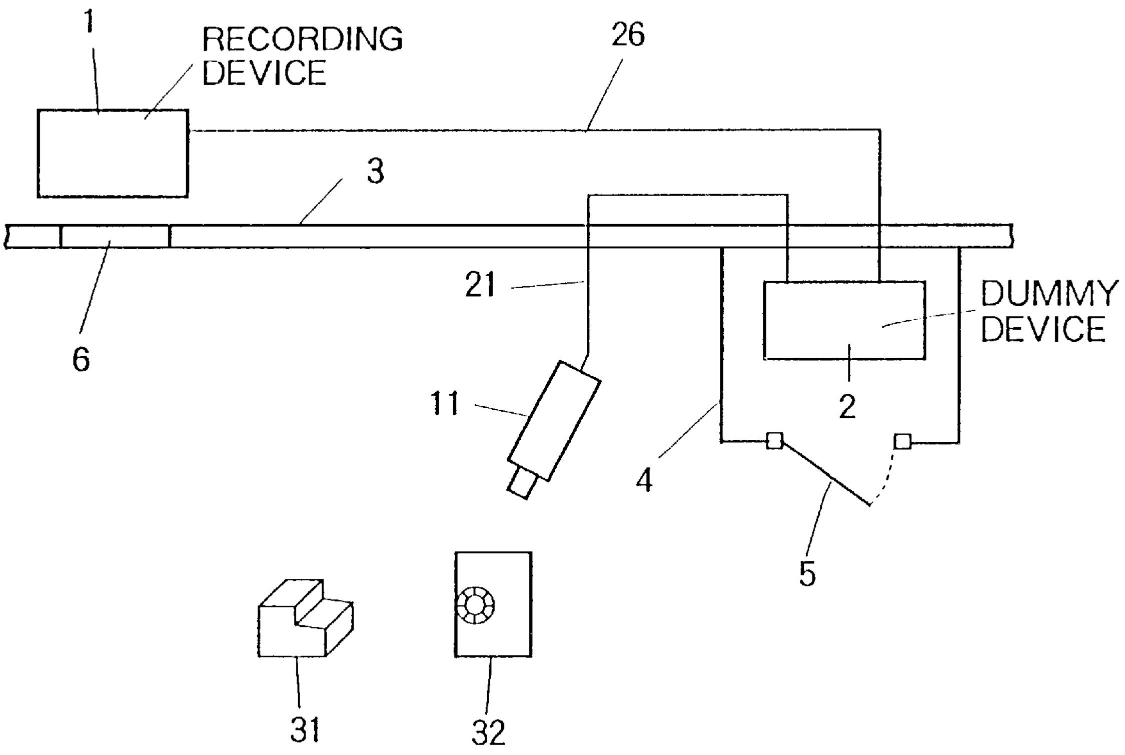
FIG. 12 is a diagram showing interconnection between a real recording device and a dummy device in Embodiment 5.
Figure 13:
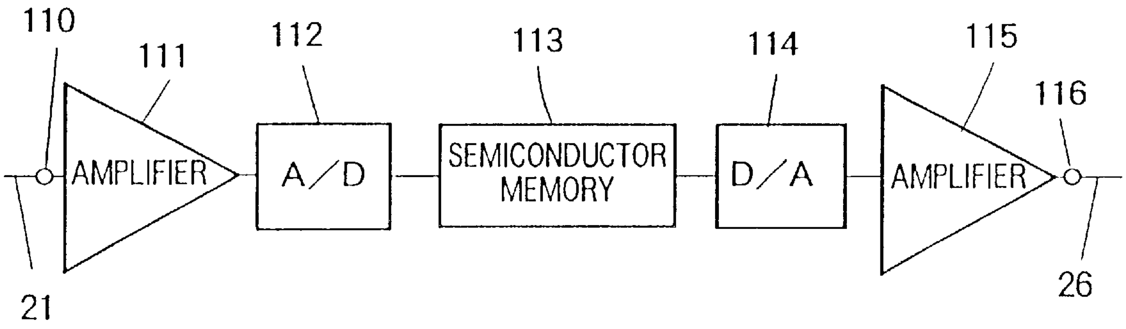
FIG. 13 is a diagram showing a semiconductor memory provided within a dummy device of Embodiment 5.

The real recording device 1 and the TV cameras may be connected via the dummy device 2 as shown in FIGS. 10 and 12, or directly.

Figure 17:
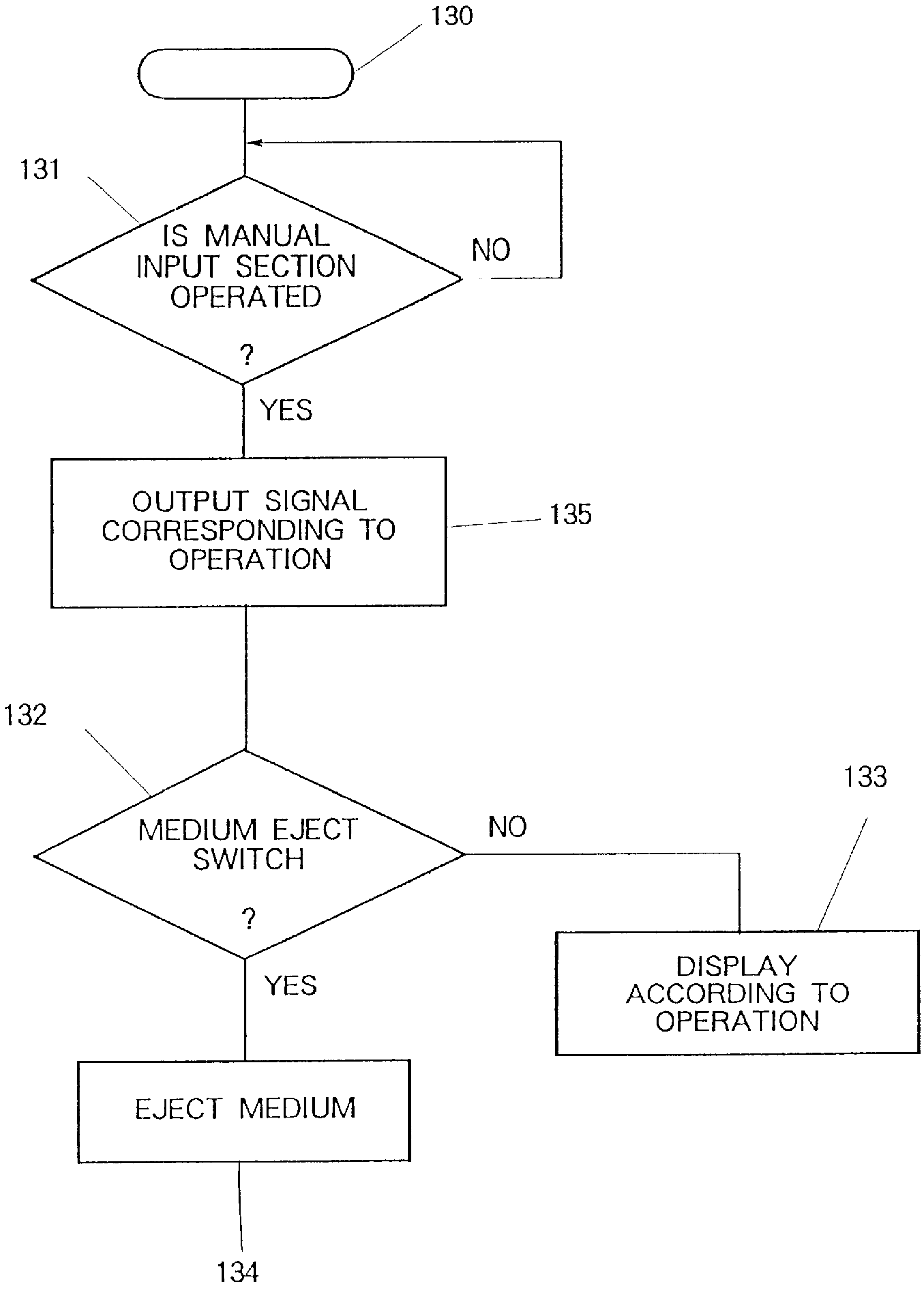
FIG. 17 is a flow chart illustrating the operation of a microcomputer of Embodiment 7.

FIG. 17 is a diagram showing the operation of the microcomputer 120 in the above-described system. The operation differs from that shown in FIG. 15 only in the additional step 135 inserted after the step 131. In the step 135, a signal indicative of operation on the manual input section is transmitted to a control signal line 27 via the control line 127.

On the basis of the signal transmitted via the above control signal line 27, the microcomputer 140 controls the mechanism and the recording/playback section according to the state of the operated switch. In this way, recording and playback of information, and stopping are effected.

In addition to the above-described functions, signals indicative of the state of the real recording device may be sent from the real recording device 1 to the dummy device 2, and the state of the real recording device may be displayed by the display section of the dummy device 2.

Embodiment 8

In each of the above embodiments, the dummy device does not have a function of actual recording or playback, but has the appearance similar to that of the real recording device and is capable of insertion and ejection of a recording medium. However, a recording device (ordinary recording device) which has functions of recording and playback may be used as a dummy device. In this case, it may be so arranged that the dummy device and the real recording device record the same information. When the recording medium is taken away from the dummy device, the recording device in the real recording device will not be taken away.

The TV cameras, the real recording device and the dummy device may be connected as shown in FIG. 10, or the real recording device and the dummy device may be connected directly to a distributor which is connected to the TV cameras.

Embodiment 9

Figure 18:
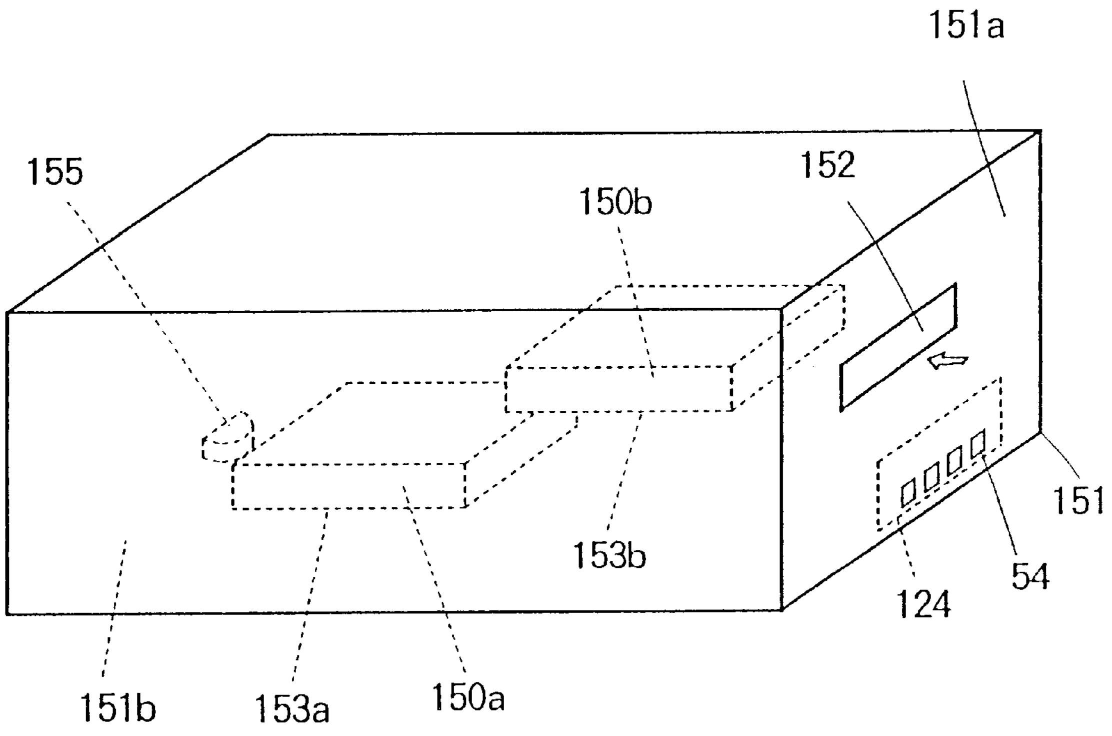
FIG. 18 is a schematic diagram of a recording device of Embodiment 9 of the present invention.

Embodiment 9 will next be described with reference to FIG. 18. This embodiment is a surveillance information recording device having first and second loading sections 153*a* and 153*b* within a single housing as shown in the figure. These loading sections 153*a* and 153*b* can accommodate recording media 150*a* and 150*b* respectively. In the first loading section 153*a*, it is possible to perform recording and playback on or from the recording medium, by means of a recording head 155. In the second loading section 153*b*, recording and playback are not possible. Insertion of a recording medium into these loading section 153*a* and 153*b* is achieved via a common insert/eject opening 152. The recording device of this embodiment may be considered as i unified version obtained by integrating a dummy device and a real recording device of Embodiment 1, Embodiment 2, and the like.

In the illustrated embodiment, insertion or ejection of a recording medium to or from the first loading section 153*a* cannot be performed in a state in which another recording medium is in the second loading section 153*b*. That is, the arrangement is such that one recording medium can be inserted into the second loading section 153*b* after another recording medium has been inserted in the first loading section 153*a*, and a recording medium can be ejected from the first loading section 153*a* after another recording medium is ejected from the second loading section 153*b* has been ejected.

In Embodiment 9, ejection of the recording medium from the second loading section 153*b* is done by operating the eject button 54 as with an ordinary recording medium, or as explained in connection with Embodiments 1 to 8. The ejection of the recording medium from the first loading section 153*a* is not enabled till some special operation is done. For instance, it may be so arranged that the switches in the manual input section 122 must be operated/manipulated in a special manner (e.g., by pressing two buttons simultaneously), or by inputting a password.

Embodiment 10

Figure 19:
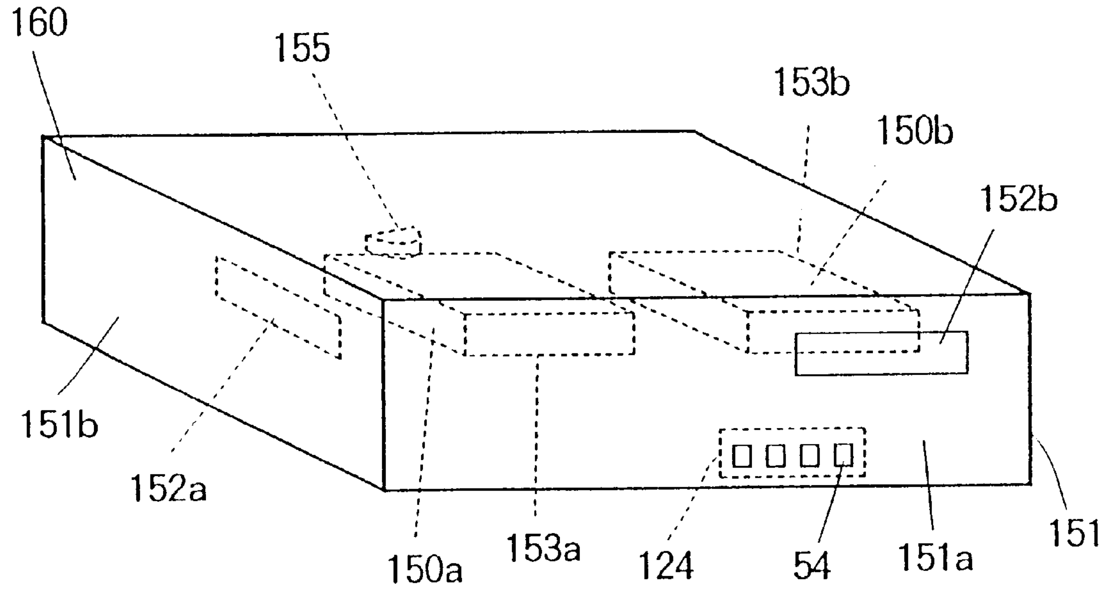
FIG. 19 is schematic diagram or a recording device of Embodiment 10.

Embodiment 10 will next be described with reference to FIG. 19. As in Embodiment 9, the present embodiment is a surveillance information recording device which has first and second loading sections 153*a* and 153*b*. These loading sections 153*a* and 153*b* can accommodate recording media 150*a* and 150*b*, respectively. In the first loading section 153*a*, recording and playback on or from the recording medium 150*a* is possible by means of a recording head 155. In the second loading section 153*b*, recording and playback are not possible. Insertion of a recording medium into the second loading section 153*b* is done via an insert/eject opening 152*b*, while insertion of a recording medium into the first loading section 153*a* is done via another insert/eject opening 152*a*.

The insert/eject opening 152*b* is provided in the front side 151*a* of the device case 151 as in an ordinary recording device. The insert/eject opening 152*a* is provided in an inconspicuous position such as a side of the device, being concealed by a covering member 160. The covering member 160 is for example a panel set up with screws, which exhibits an appearance similar to that of a side panel of an ordinary recording device which does not have any opening. Therefore, it is difficult to know the presence of the insert/eject opening 152*a*, and hence the presence of the loading section 153*a*, and the recording medium in it. As a result, the recording medium is prevented from being taken away.

In order for the user to eject the recording medium from the insert/eject opening 153*a*, the covering member 160 can be removed or opened, which permits the medium in the loading section 153*a* to be ejected. Removing or opening of the covering member 160 can be done by loosening or removing the screws.

In Embodiment 10, like in Embodiment 9, ejection of the recording medium from the second loading section 153*b* is done by operating the eject button 54 as with an ordinary recording medium, or as explained in connection with Embodiments 1 to 8. The ejection of the recording medium from the first loading section 153*a* is not enabled till some special operation is done. For instance, it may be so arranged that the switches in the manual input section 122 must be operated/manipulated in a special manner (e.g., by pressing two buttons simultaneously), or by inputting a password.

Modifications

When a dummy device and a real recording device are separated as in Embodiments 1 through 8, it may also arranged that the ejection from the real recording device can be achieved only by operation of the switches in a special manner or by input of a password.

What is claimed is:

1. A surveillance information recording device, comprising:

first and second loading sections, each capable of loading a recording medium;

means for recording on the recording medium loaded in said first loading section;

means ejecting the recording medium from said first loading section;

means for ejecting the recording medium from said second loading section;

wherein the ejection from said second loading section is effected in a manner similar to that in which ejection is effected in an ordinary recording device; and the ejection from said first loading section is effected in a different way from the ejection from said second loading section.

2. A device as defined in claim 1, wherein the ejection from said first loading section is effected by means of operation of manual input means in some special mode or operation including entry of a password.

3. A device as defined in claim 2, wherein a common opening is used both for said ejection from said first loading section and for said ejection from said second loading section, and said ejection from said first loading section cannot be effected in a state in which said second loading section is loaded with a recording medium.

4. A device as defined in claim 1, further comprising:

a first outlet for said ejection from said first loading section, and a second outlet for said ejection from said second loading section;

said second outlet being separate from said first outlet, and being concealed.

5. A device as defined in claim 4, wherein said ejection from said first loading section is effected by means of operation of manual input means in some special mode or operation including entry of a password.

* * * * *